United States Patent [19]

Richardson

[11] Patent Number: 4,984,143
[45] Date of Patent: Jan. 8, 1991

[54] COLOR FILTER CHANGER

[75] Inventor: Brian E. Richardson, San Jose, Calif.

[73] Assignee: Morpheus Lights, Inc., San Jose, Calif.

[21] Appl. No.: 407,392

[22] Filed: Sep. 14, 1989

Related U.S. Application Data

[63] Continuation of Ser. No. 224,456, Jul. 26, 1988, Pat. No. 4,914,556.

[51] Int. Cl.⁵ ............................ G02B 5/22; F21V 9/00
[52] U.S. Cl. .................................... 362/293; 362/282; 362/323; 350/313; 350/314; 350/315
[58] Field of Search ............... 362/293, 282, 322, 323; 350/313, 314, 315, 316

[56] References Cited

U.S. PATENT DOCUMENTS

| | | | |
|---|---|---|---|
| 2,416,919 | 3/1947 | Goldsmith | 350/314 X |
| 3,237,513 | 3/1966 | Dreyfoos et al. | 350/314 X |
| 3,260,152 | 7/1966 | Aston | 88/24 |
| 3,418,048 | 12/1968 | Veit | 350/316 X |
| 3,754,824 | 8/1973 | Weisglass et al. | 355/35 |
| 3,943,019 | 3/1976 | Krekeler et al. | 156/99 |
| 4,325,083 | 4/1982 | Rouchon et al. | 358/228 |
| 4,392,187 | 7/1983 | Bornhorst | 362/293 X |
| 4,600,976 | 7/1986 | Callahan | 362/227 |
| 4,602,321 | 7/1986 | Bornhorst | 362/293 X |
| 4,800,474 | 1/1989 | Bornhorst | 362/293 |

Primary Examiner—Allen M. Ostrager
Attorney, Agent, or Firm—Rosenblum, Parish & Bacigalupi

[57] ABSTRACT

Spectral filter means (20) in which filter elements (22) have elongated planar surface areas covered with patterns of filtering material (44, 84, 94). Filter elements are independently movable parallel to their respective surface planes to positions (32) where a given density pattern of filtering material is intersected by a beam of light and filters a given component of the light. Separate filter elements (22a, 22b, 22c) for each of the primary colors and an additional element (22d) for dimming all colors are used to control the color and intensity of a beam of light.

11 Claims, 4 Drawing Sheets

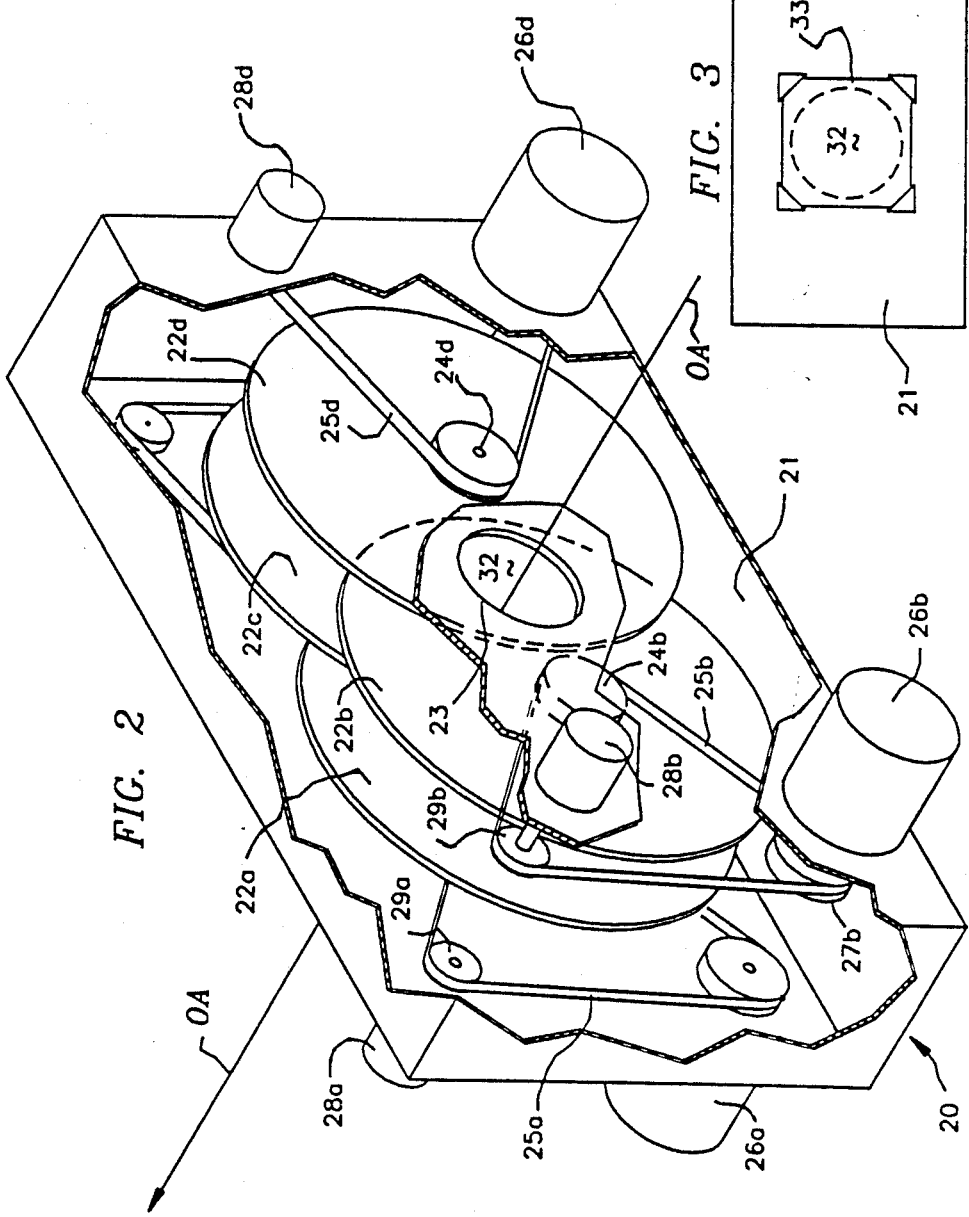

COLOR FILTER CHANGER

This is a continuation of application Ser. No. 224,436, filed Jul. 26, 1988 now Pat. No. 4,914,556.

BACKGROUND OF THE INVENTION

1. Field of the Invention

The present invention relates generally to optical filtering systems and more particularly to an improved filtering system for controlling the color of light projected by a spot light or the like.

2. Discussion of the Prior Art

Conventional lighting systems have been provided with replaceable filters for modulating the color and/or intensity of light projected through the filters. U.S. Pat. No. 3,411,847 describes a photographic film developing system which passes a beam of white light through filters which each uniformly attenuates a respective primary color. The filters are individually positioned to be intersected by the beam during fractions of a film developing interval which are proportional to the fraction of that color in the average desired color of the light over the entire interval. The filtered light is differently colored during different fractions of the interval and typically at no one instant has the desired average color.

U.S. Pat. No. 4,459,014 describes a system of three unspecified or uniform density primary color filters which are individually and constantly positioned in parallel so that they are intersected by light in a proportional cross-sectional area of a beam while white light passes in the unfiltered remaining area of the beam. The downstream beam has the desired average color but its hue and intensity is non-uniformly distributed and inefficient to diffuse.

U.S. Pat. No. 4,600,976 describes a comparable mechanism in which multiple unspecified (uniform) density primary color filters are individually rotatable in parallel planes to be intersected by proportional areas of a light beam, and thereby yield a downstream beam that also has the desired overall average color but with a non-uniform intensity distribution, which again requires substantial diffusion.

In U.S. Pat. No. 4,602,321 each of three sets of filters include filter elements with respective planar surfaces which are uniformly covered with dichroic filtering material. The filter elements are rotatable around axes in their respective surface planes to positions oblique to the optical axis of the beam. This produces a downstream beam with a selected one of various colors distributed generally uniformly. However, dichroic filters being rotated about axes non-normal to their surfaces differently affect different spectra of light along the beam axis. This limits the possible colors and/or intensities producible by this technique with given sets of color filter elements.

There remains therefore a need for a spectral filter for selectively, continuously, uniformly, and conveniently varying the spectral composition of a beam of light projected through the filter.

SUMMARY OF THE PRESENT INVENTION

It is therefore a primary objective of the present invention to provide an improved means for controlling the spectral composition of light in a beam projected through a lighting system.

Another objective of the present invention is to provide a means for generally uniformly filtering light across the area of a beam.

Still another objective of the present invention is to provide means for conveniently and efficiently producing a selected color of light.

Briefly, a preferred embodiment of the present invention includes a component color filter element comprising a disk formed from a substrate with a surface extended in a planar area having discrete regions located in interstices of a connected background region, either of which regions are covered with a predetermined density pattern of filtering material. In one embodiment the filtering material average density varies generally uniformly in beam-size areas around successive points along the length of a gradient axis through the extended area. A plurality of different color filter elements may be positioned for selected areas of the various elements to be intersected by, and to filter predetermined proportions of the spectrum of, a beam. A filter module according to a preferred embodiment of the invention uses three component color filter elements with filtering material for filtering respective primary colors and uses a fourth filter element with filtering material for dimming the intensity of all colors.

Among the advantages of the present invention are that each component color filter yields a beam having that filter's color distributed with a selected and uniform or relatively uniform intensity across the area of the beam, which requires less diffusion and wastes less light than prior art light color filters.

These and others objects of the present invention will become apparent to those skilled in the art upon reading the following detailed description of the preferred embodiments which are shown in the several figures of the drawing.

BRIEF DESCRIPTION OF THE DRAWING

FIG. 2 is an isometric view showing further details of the filter module of FIG. 1;

FIG. 3 is a rear view of the filter module of FIGS. 1 and 2;

DETAILED DESCRIPTION OF THE PREFERRED EMBODIMENT

Figure 1:
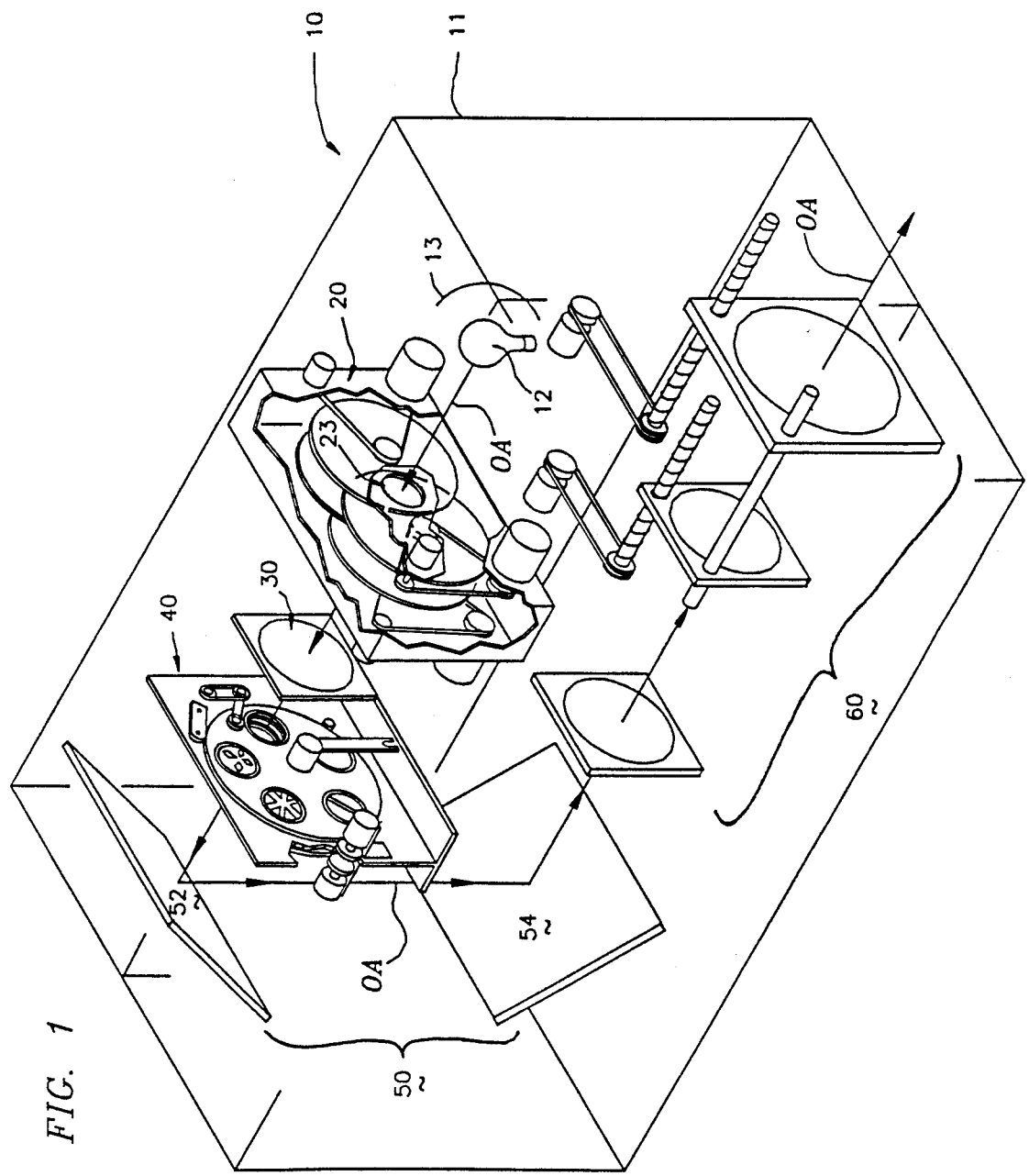
FIG. 1 is a partially cut away isometric view of a lighting system including a preferred embodiment of a spectral filter module according to the present invention.

Referring to FIG. 1 the present invention is preferably embodied in a spectral filter module 20 as illustrated in use in a spot light projection system 10. System 10 is supported by suitable brackets (not shown) within a housing 11 (shown in schematic outline) and includes a light source, preferably an arc lamp 12 with a reflector 13, which radiates white light (leftward in FIG. 1) along optical axis OA. The radiated light is preferably filtered through a conventional "hot filter" (not shown) which removes infra-red and ultra-violet light while passing visible light. Referring also to FIG. 2, the light then enters module casing 21 through front opening 23, passes as a beam in generally cylindrical region 32 through module 20, exits module casing 21 from its back side and passes through a diffuser 33, preferably an acid-etched glass plate, mounted on module casing 21 as shown in FIG. 3.

In system 10 the filtered light beam then travels through a condenser lens 30 which directs the light along axis OA. At a focal plane of the system of lenses 30 and 60 he beam is optionally passed through selectable aperture module 40 as further described in Applicant's application Ser. No. 224,438 filed 7/26/88 now Pat. No. 4,891,738.

The beam, which may also be reflected by an optional beam folding (mirror) means 50, finally traverses triplet lens system 60 which projects the beam from system 10 along axis OA. To direct the beam as desired, housing 11 may be vertically tilted and/or horizontally panned on gimbal joints as further described in Applicant's co-pending application Ser. No. 224,437 filed 7/26/88.

Spectral filter module 20 is preferably positioned with cylindrical region 32 centered around axis OA elsewhere than in a focal plane of triplet lens 60. Although FIG. 1 shows module 20 positioned upstream of lens 30, it is alternately possible to position module 20 either downstream of lens 30, downstream of selectable aperture module 40, downstream of beam folding mirror 52 or mirror 54, or between lenses in triplet lens 60.

As further shown in FIG. 2, filter module 20 comprises four spectral component filter elements 22. Each filter element 22 is independently movable in directions parallel to the plane of its surface. Filter elements 22 are preferably disposed with their surfaces in respective parallelspaced planes which are normal to optical axis OA, although the filter elements do not necessarily have to be mounted coaxially or even in parallel. For example in alternate embodiments of a filtering module each filter element could be mounted to rotate about a respective axis of rotation non-parallel to the axes of rotation of the other elements. In module 20 filter elements 22 are grouped in one pair of disks (22a and 22b) having mutually coaxial hubs of which one is shown at 24b, and in another pair of disks (22c and 22d) having mutually coaxial hubs of which one is shown at 24d. The pairs of disks overlap in cylindrical region 32.

In module 20, each disk hub 24 has a respective pulley turned by a belt 25 which is driven by a motor 26 through a pulley 27. Motors 26 may be direct current analog servo-motors controlled by feedback from respective potentiometers 28, or digital stepper motors without feedback control. In the case of analog servomotors, the angular position of each disk 22 is sensed by a respective potentiometer 28 with a pulley 29 turned by a belt 25.

Each filter element comprises regions of filtering material which may be formed in or on a substrate. The substrate may be opaque in alternate embodiments (not shown) that only allow using reflected light, but is preferably transparent, for example comprising a glass such as Pyrex (R), in embodiments that allow using either reflected or transmitted light. Alternately, the substrate could have discrete void regions in interstices of a background region of filtering material.

Figure 4:
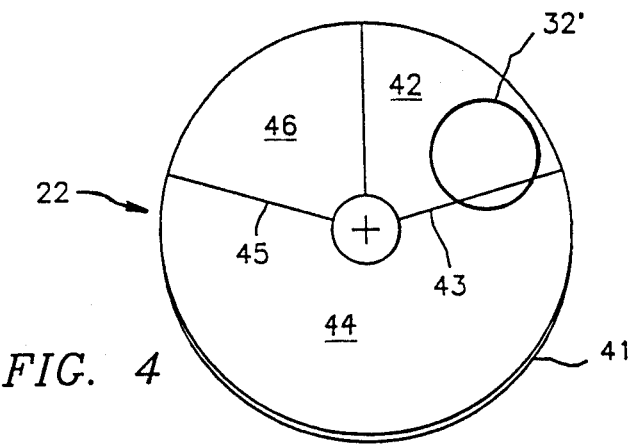
FIG. 4 is an isometric illustration of a filter element in an embodiment as a disk-shaped substrate with an arcuate gradient axis and being partially covered with filtering material.

Each substrate has an elongated planar surface area preferably coated with filtering material in a pattern the average density of which determines the attenuation of light intersecting different areas of the filter. The pattern density may be constant to attenuate light by a predetermined constant amount, or may vary through pattern areas around successive points along a gradient axis to attenuate light by predetermined varying amounts. In the preferred embodiment as shown in FIG. 4, disk-shaped substrate 41 has a planar side surface divided into three sectors 42, 44 and 46. Relatively transparent end portion 42 is not covered with filtering material and when positioned to be intersected by the beam, passes the entire spectrum of visible light.

In each disk 22, patterned sector 44 is partially covered with filtering material in a progressively denser pattern which begins with a low average density in a beam-size area around a point at radial boundary 43 and, as will be further described below, becomes nearly solid as it approaches radial boundary 45. Sector 46 is solidly covered with the filtering material. The pattern of filtering material progressing from radius 43 preferably increases in average density with the square of the arcuate gradient axis length, so that light filtering increases linearly with the arcuate gradient axis length, around the disk towards radius 45. In the preferred embodiment of the filter module, three filter elements 22 are partially covered with color-specific material for filtering respective primary colors while a fourth element 22 is partially covered with opaque material for attenuating the intensity of all colors in a beam of a light. The preferred filtering media is a coating of dichroic material, available for example from the Optical Coating Laboratory Inc. of Santa Rosa, Calif., or from the Corion Corporation of Holliston, Mass. The dichroic filtering material may be patterned using either a positive or negative photoresist or a metal mask formed either before or after the dichroic material is deposited on the substrate surface.

Figure 5:
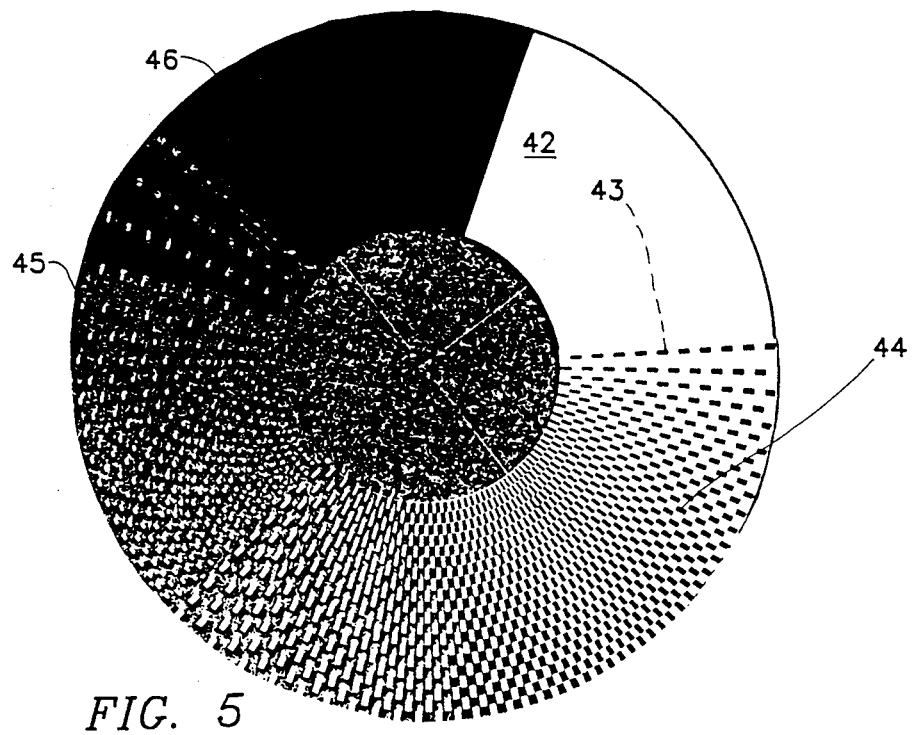
FIG. 5 illustrates an example pattern of filtering material for attenuating light in direct linear proportion to the length of an arcuate gradient axis across the pattern.

FIG. 5 shows an example pattern of variably configured disjoint discrete and connected background regions of filtering material. Alternately, dots or other pattern shapes could be used, and non-linear variations in filtering effect along the length of the surface could be compensated for by positioning the filter elements under computer control (not shown).

Figure 6:
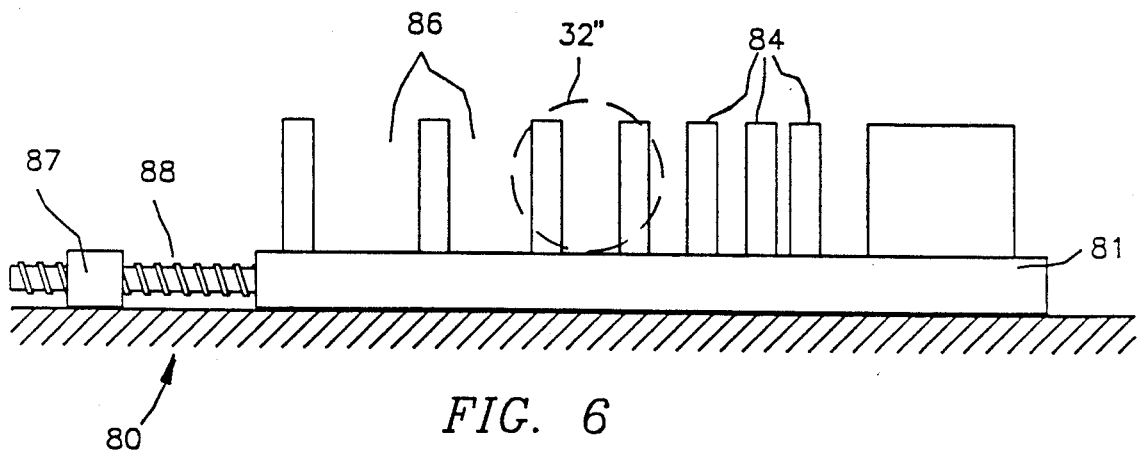
FIG. 6 illustrates a second embodiment of a filter element according to the present invention in the form of a straight strip.

FIG. 6 shows a second embodiment of a filter element 80 in the form of a base 81 holding substrate means including discrete regions 84 of filtering material and separated by continuously varying width clear areas 86. Note that the spacings of regions 86 between the bar-shaped regions 84 decrease from one end to the other of a gradient axis along the elongated base 81. A spectral filter in this embodiment would use linear actuators such as motors 87 and lead screws 88 supported in a casing (not shown) to position filter element 80 so that a selected area of its surface as illustrated by dashed circle 32" is intersected by the beam.

Figure 7:
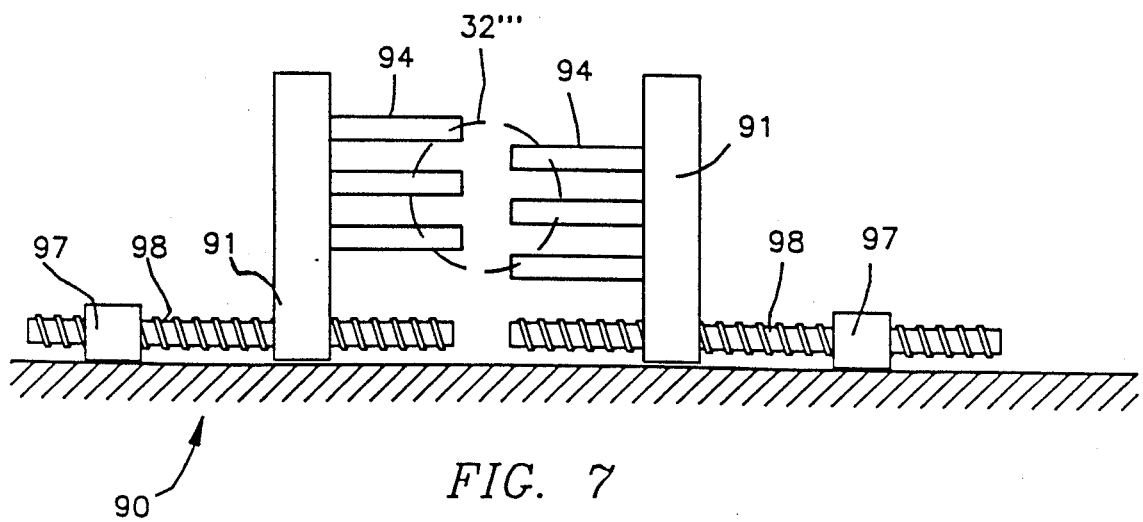
FIG. 7 illustrates a third embodiment of a filter element according to the invention in the form of substrate means including a pair of planar surface areas and which are supported on diametrically opposite sides of a beam and movable towards and away from the beam axis to substantially uniformly attenuate the color of the beam of light.

FIG. 7 shows a third embodiment of a filter element 90 in the form of a pair of filter element bases 91 supporting respective substrates 92, having elongated planar surface areas partially covered with patterns of preferably equally spaced filter material 94, which are driven for example by motors 97 and lead screws 98 to be inserted from diametrically opposite sides into the cylindrical region 32''' intersected by a light beam. In an alternate embodiment, each bar of filtering material 94 is formed on a separate substrate which is disposed in cantilever relationship with one of bases 91, and which may have a different width.

In operation to produce given colors and/or intensities in light beams projected along optical axis OA in the generally cylindrical region 32 through filter module 20, drive motors 26a, 26b, 26c (not shown) and 26d are individually activated. At different times different selected portions of the surface of each element are intersected by the beam. Motors 26 turn respective pulleys 27 which drive belts 25 to rotate disks 22 through angles as sensed by potentiometers 28 to positions where each filter disk 22 has a surface portion with a predetermined filter density pattern in the cylindrical region 32 intersected by light along axis OA. The three color filter element's elements positions determine the relative proportions of the three primary color components of the beam. The fourth disk 22 is positioned as desired to dim the overall intensity of the light beam. Alternately, instead of using a fourth disk, the three color disks may be individually rotated as appropriate to maintain the relative balance of color in the projected beam while varying its overall intensity.

Although the present invention has been described in preferred embodiments, it will be appreciated by those skilled in the art that these embodiments may be modified without departing from the essence of the invention. The filters may be used for example in photography, video or graphics systems. It is therefore intended that the following claims be interpreted as covering any modifications falling within the true scope and spirit of the invention.

I claim:

1. Spotlight color filter changer means for adjustably attenuating selectable bands of color of light in a beam projected along an optical axis, comprising:

three color component hue filter disks each having a substrate with a planar surface for rotating around a corresponding rotation axis normal thereto, and supporting a respective primary subtractive hue dichroic filtering medium distributed so that surface areas of equal sizes surrounding points along an arcuate gradient axis at all angles increasingly from one end of said gradient axis around said rotation axis to the other end increasingly attenuate the saturations of respective hues of light in said beam intersecting those areas through said disk; and component filter disk changer means including respective drive mechanisms for independently and adjustably rotating each said component hue filter disk.

2. Filter changer means as in claim 1 wherein said rotation axes are spaced parallel to, and equally distant radially from, said optical axis.

3. Filter changer means as in claim 2 comprising at least two separate axes of rotation.

4. Filter changer means as in claim 3 wherein said axes of rotation are spaced apart by arcs having equal angles around said optical axis.

5. Filter changer means as in claim 4 comprising two rotation axes spaced diametrically across said optical axis from each other.

6. Filter changer means as in claim 5 wherein said drive mechanisms are disposed beside non-adjacent surfaces of respective substrates to drive said disks from their outer sides.

7. Filter changer means as in claim 5 comprising: casing means which has a front side for admitting said beam of light, which contains said filter disks, and which supports said drive mechanisms each beside a respective substrate surface non-adjacent any surface of any other disk co-axial therewith.

8. Filter changer means as in claim 7 wherein said drive mechanisms each comprises: hub means fixed co-axially to the respective substrate; coupling means; and motor means.

9. Filter changer means as in claim 8 wherein said coupling means each comprises pulleys and a belt for connecting said hub means to said motor means.

10. Filter changer means as in claim 9 wherein said motor means each comprises a digital stepper motor.

11. Filter changer means as in claim 9 wherein said motor means each comprises an analog servo motor, and wherein said drive mechanisms each further comprises potentiometer means having a pulley connected by said belt to said hub means of the respective substrate.

* * * * *

UNITED STATES PATENT AND TRADEMARK OFFICE
CERTIFICATE OF CORRECTION

PATENT NO.   :   4,984,143
DATED        :   January 8, 1991
INVENTOR(S)  :   Brian E. Richardson It is certified that error appears in the above-identified patent and that said Letters Patent is hereby corrected as shown below:

Column 1, line 58, delete "color" and insert --colored--.

Column 4, line 35, "The preferred" should begin a new paragraph.

Column 5, line 19, delete "element's elements" and insert --elements'--.

Signed and Sealed this

Twenty-ninth Day of September, 1992

Attest:

DOUGLAS B. COMER

*Attesting Officer*   *Acting Commissioner of Patents and Trademarks*